April 19, 1927.  E. G. OAKLEY  1,625,492
METHOD OF MAKING TIRE VALVE CASINGS
Filed July 3, 1924   2 Sheets-Sheet 1
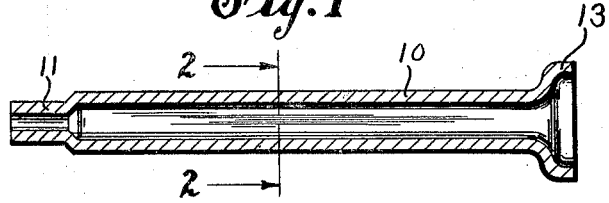
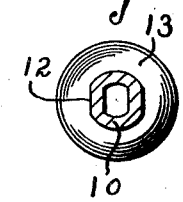
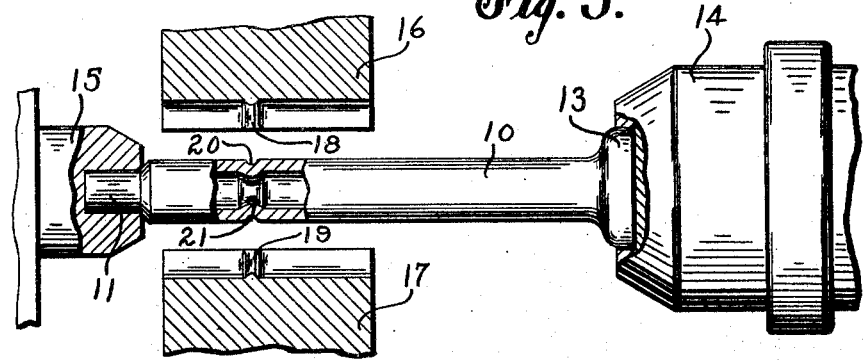
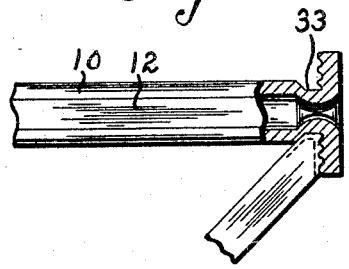
Inventor
Erastus G. Oakley
By Henry E. Rockwell
Attorney

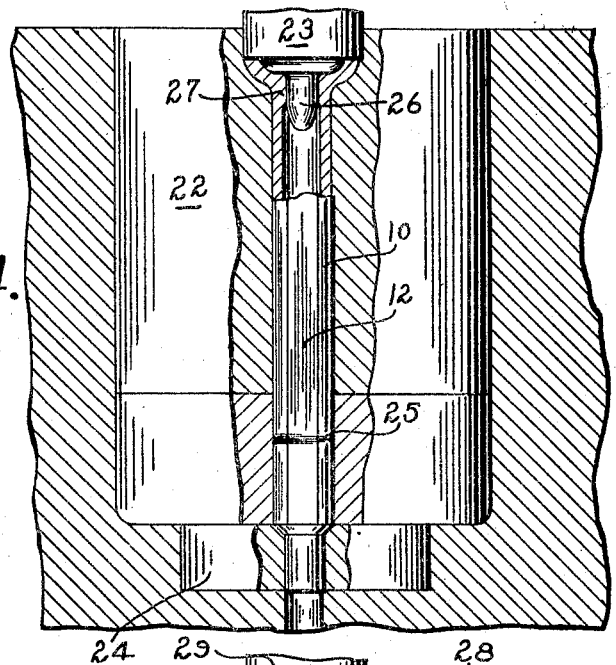
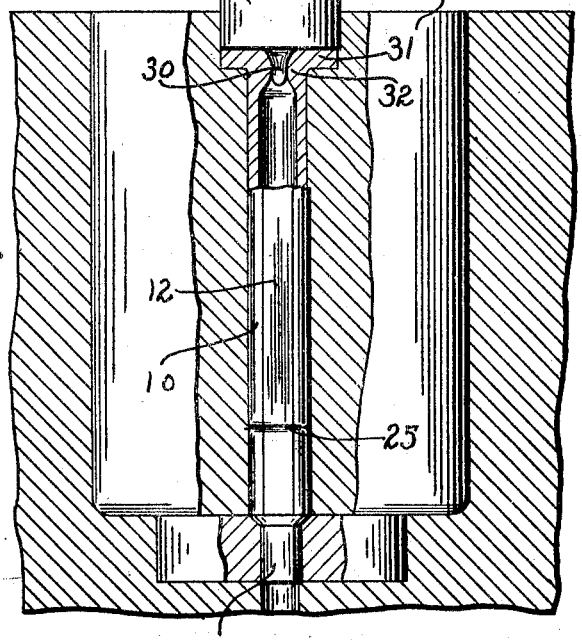

Patented Apr. 19, 1927.

1,625,492

UNITED STATES PATENT OFFICE.

ERASTUS G. OAKLEY, OF SOUTHPORT, CONNECTICUT, ASSIGNOR TO BRIDGEPORT BRASS COMPANY, OF BRIDGEPORT, CONNECTICUT.

METHOD OF MAKING TIRE-VALVE CASINGS.

Application filed July 3, 1924. Serial No. 724,084.

This invention relates to a method of making tire valve casings or so-called valve stems, and more particularly to a valve stem designed for use with pneumatic tires, the invention being particularly concerned with the tube or casing in which the valve proper is mounted. In the past, such stems or casings have usually been manufactured from a piece of solid bar stock. In the process of manufacturing the casings from material of this character, it is necessary to drill an opening through the entire length of the bar in order to provide for the admission of air to the tire after the stem has been connected therewith. For a number of reasons, a valve stem made by such a method possesses many inherent defects and disadvantages, and my improved process has to do with the manufacture of such articles from hollow shells or tubes. I prefer to form these tubes from a sheet metal blank and by a series of drawing operations. By my method, the casings or shells may be made substantially in their finished form by such operations thus doing away with more expensive mechanical processes or hand work in their manufacture.

The process illustrated in this application is an improvement upon the method disclosed in my prior application, Serial No. 649,668, filed July 5, 1923, in that certain independent steps in the prior process have been combined into single operations, thus accomplishing a reduction in the number of operations necessary to produce the completed article. Also, other parts of the process have been improved so that the valve stem may be produced more economically, and the finished article is superior in some respects to the valve casing produced by prior methods.

One object of my invention is the provision of an improved method of producing a tire valve stem by a series of drawing operations.

Another object of my invention is the provision of an improved method of producing tire valve stems by a series of drawing operations which may be more economically carried out than processes now in use for making such articles.

Another object of my invention is to provide an improved process of making tire valve casings from a drawn metal shell in which the fewest possible operations will be employed so as to cheapen as far as possible the production of the finished article.

To these and other ends the invention consists in the novel features and combination of parts to be hereinafter described and claimed.

In the accompanying drawings:

Fig. 1 is a sectional view of a drawn metal shell as it appears before it has been given the shape desired in the finished valve stem;

Fig. 2 is a sectional view on line 2—2 of Fig. 1;

Fig. 3 shows the operation of displacing the wall of the shell or casing to form the internal shoulder;

Fig. 4 is a sectional view showing the operation of closing together the groove formed by the displacement of the wall, as shown in Fig. 3, simultaneously with the formation of an enlarged head at the base of the stem;

Fig. 5 is a view similar to Fig. 4, showing the completion of the heading operation; and Fig. 6 is a view partly in section showing the cutting away of the metal adjacent the head or base to form the lower neck.

The drawn metal shell 10, shown in Fig. 1, may be formed in several ways, but I prefer to subject a metal blank in the form of a disk to a cupping operation and thereafter by a series of drawing operations to draw the resulting cup into a relatively long shell having comparatively thin walls. By a succeeding drawing operation one end, usually the closed end of the shell, may then be reduced, as shown at 11, to form the upper neck and the remainder of the body of the shell is provided at the same time with the flat sides 12 upon opposite sides of the body of the blank. It will be observed that the bore of the blank, as shown in Fig. 2, is also oblong in shape or provided with opposite flat sides as well as the exterior. The wall of the shell at the other end thereof is flared outwardly, as shown at 13, preparatory to forming an enlarged base or head as will be hereinafter explained.

Valve casings of this character are usually provided with an internal shoulder upon which a part of the valve proper is adapted to seat. I have found that this shoulder may be expediently formed by displacing inwardly the wall of the shell so that an annular recess is formed exteriorly of the shell and at the same time an interior annular shoulder will be produced. For this purpose, the shell may be placed in the revolving chuck 14, shown in Fig. 3, while the other end may be held in a suitable work holder 15. While the shell 10 is being rotated it may be operated upon by a suitable hammer or swaging tool 16, the portion of the blank being operated upon resting upon a suitable die 17. The hammer and die are provided with ribs 18 and 19 which, when the hammer is brought down upon the rotating shell, will displace the wall thereof to form the exterior annular groove 20 and the corresponding interior shoulder 21.

As it is usually necessary to thread the exterior of the valve stem for its entire length, due to the fact that usually the washer nut and rim nut are threaded thereon, it is desirable that the exterior of the shell present a smooth and continuous surface, and for this reason the walls of the groove 20 may be closed together so that the surface of the shell will be substantially smooth and may be readily threaded. This is effected by placing the shell in a suitable die 22, shown in Fig. 4, and bringing down upon the upper end thereof a punch 23, while the lower end is suitably supported in a die 24. The punch is brought down with such force upon the upper end of the stem that the walls of the groove 20 are closed together, as shown at 25, and simultaneously therewith, due to the force of the blow and also to the shape of the punch, the flared end 13 of the shell wall is thickened and the metal therein caused to flow preparatory to forming the broad flat head upon the lower end of the stem. Thus a substantial part of the heading operation is performed simultaneously with the closing together of the walls of the groove.

The punch 23 is provided with a central projection or pin 26 which projects within the bore of the metal shell and while it prevents the collapsing of the shell wall adjacent the upper end thereof, it permits the metal of the wall to flow inwardly, as shown for instance at 27, so that the wall is considerably thickened at this point.

The formation of the head is then completed by a subsequent drawing or stamping operation, shown in Fig. 5, wherein the blank is shown as supported in a suitable die 28 while operated upon by the punch 29, provided with a small central projection or pin 30. The result of this operation is to form the broad flat head 31 upon the base of the shell while at the same time the metal is caused to flow inwardly about the pin 31 so as to provide a relatively thick wall adjacent the pin, as shown at 32.

The provision of a thickened wall at this point permits the exterior neck 33 to be cut in the shell wall, as shown in Fig. 6, without impairing the strength of the finished stem. In other words, the metal is sufficiently thickened adjacent the head so that sufficient material may be removed to form the lower neck and still leave a thickness of metal substantially equal to that of the side wall of the casing. It will be obvious, of course, that this would not be the case if it was attempted to cut out the neck 33, and the wall at this point were only of its original thickness.

It will be apparent that the process of producing valve casings outlined above may be quite economically performed with a small number of relative inexpensive drawing or swaging operations and at the same time a superior article will be produced.

While I have shown and described a preferred embodiment of my invention, it is to be understood that it is not to be limited to all the details shown but is capable of modification and variation within the spirit of the invention and within the scope of the appended claims.

What I claim is:

1. The process of making a valve casing or the like, which comprises displacing inwardly the wall of a tubular blank to form an interior shoulder in the tube bore, and simultaneously forming a head upon one end of the blank and closing the groove formed by the displacement of the wall.

2. The process of making a valve casing or the like, which comprises forming an exterior groove and a corresponding interior shoulder in the wall of a tubular blank by pressing inwardly the wall thereof and closing the walls of said groove while forming a head upon one end of the blank.

3. The method of making a valve casing or the like, which comprises forming an exterior groove and a corresponding interior shoulder in the wall of a tubular blank by driving inwardly the wall thereof, forming a head upon one end of the blank, and closing the walls of the groove during the heading operation.

4. The method of making a valve casing or the like, which comprises drawing a tubular shell from a suitable blank, forming an external annular groove and a corresponding internal shoulder in the shell, by displacing inwardly the wall thereof and operating upon the shell to simultaneously form a head thereon and close the walls of said groove.

5. The method of making a valve casing or the like, which comprises drawing a tubular shell from a suitable blank, forming an external annular groove and a corresponding internal shoulder in the shell, by pushing inwardly a portion of the wall thereof, and operating upon the shell to form a disk-like head at one end thereof and close the walls of said groove during the heading operation.

6. The method of making a valve casing or the like from a drawn metal shell, which comprises forming by a swaging operation an external annular groove in the wall of the shell, and a corresponding internal shoulder flowing the metal adjacent one end of the blank to form a relatively thick disk-like head, and closing the walls of said groove during the heading operation.

7. The method of making a valve casing or the like from a drawn sheet-metal shell, which comprises displacing inwardly the wall of the shell to form an external annular groove and a corresponding internal shoulder in the shell bore, supporting the blank in a suitable die, and bringing down upon one end of the blank a suitable tool to form a head upon the blank and simultaneously close the walls of said groove.

8. The method of making a tire valve stem, which comprises drawing a sheet-metal shell from a suitable blank, forming by a swaging operation an exterior annular groove in the wall of the shell and a corresponding interior shoulder, then operating upon the blank to cause the metal adjacent one end thereof to be flowed into a thick disk-like head and during the heading operation closing the walls of said groove and causing the metal adjacent the formed head to flow inwardly into the tube bore to thicken the tube wall at this point.

9. The method of making a tire valve stem, which comprises drawing a sheet-metal shell from a suitable blank, forming by a swaging operation an exterior annular groove in the wall of the shell and a corresponding interior shoulder, then operating upon the blank to cause the metal adjacent one end thereof to be flowed into a thick disk-like head and during the heading operation closing the walls of said groove and causing the metal adjacent the formed head to flow inwardly into the tube bore to thicken the tube wall at this point, and then cutting an external annular recess in the thickened wall.

In witness whereof, I have hereunto set my hand this 1st day of July, 1924.

ERASTUS G. OAKLEY.